(12) United States Patent
Robu

(10) Patent No.: US 10,886,996 B1
(45) Date of Patent: Jan. 5, 2021

(54) ANTENNA SYSTEM WITH AUTOMATED SWITCHING BETWEEN MOBILE AND STATIONARY MODES

(71) Applicant: Winegard Company, Burlington, IA (US)

(72) Inventor: Randal Robu, West Point, IA (US)

(73) Assignee: Winegard Company, Burlington, IA (US)

( * ) Notice: Subject to any disclaimer, the term of this patent is extended or adjusted under 35 U.S.C. 154(b) by 0 days.

(21) Appl. No.: 16/549,149

(22) Filed: Aug. 23, 2019

(51) Int. Cl.
| | |
|---|---|
| *H04B 1/38* | (2015.01) |
| *H04B 7/08* | (2006.01) |
| *H01Q 3/08* | (2006.01) |
| *H01Q 25/04* | (2006.01) |
| *H01Q 1/32* | (2006.01) |
| *H04B 1/3827* | (2015.01) |
| *H04B 7/0404* | (2017.01) |
| *H04B 7/06* | (2006.01) |
| *H01Q 1/42* | (2006.01) |
| *G01P 15/00* | (2006.01) |

(52) U.S. Cl.
CPC ......... *H04B 7/0834* (2013.01); *H01Q 1/3275* (2013.01); *H01Q 1/42* (2013.01); *H01Q 3/08* (2013.01); *H01Q 25/04* (2013.01); *H04B 1/3827* (2013.01); *H04B 7/0404* (2013.01); *H04B 7/0602* (2013.01); *G01P 15/00* (2013.01)

(58) Field of Classification Search
CPC .. H04B 7/0834; H04B 1/3827; H04B 7/0404; H04B 7/0602; H01Q 1/3275; H01Q 25/04
See application file for complete search history.

(56) References Cited

U.S. PATENT DOCUMENTS

| | | | |
|---|---|---|---|
| 4,918,431 A | 4/1990 | Borras | |
| 6,018,650 A | 1/2000 | Petsko et al. | |
| 6,032,054 A | 2/2000 | Schwinke | |
| 6,337,628 B2 | 1/2002 | Campana | |
| 6,370,369 B1 | 4/2002 | Kraiem et al. | |
| 6,560,443 B1 | 5/2003 | Vaisanen et al. | |
| 6,940,470 B2 * | 9/2005 | Nesic ................. | H01Q 1/38 343/895 |
| 7,511,673 B2 | 3/2009 | Man et al. | |
| 9,007,970 B2 | 4/2015 | Bengtsson | |
| 2010/0151898 A1 | 6/2010 | Lee et al. | |
| 2010/0164790 A1 | 7/2010 | Wisnewski et al. | |
| 2010/0311480 A1 | 12/2010 | Raines et al. | |
| 2013/0316662 A1 * | 11/2013 | Bengtsson ............ | H04B 17/00 455/77 |
| 2015/0217711 A1 | 8/2015 | Kawada et al. | |
| 2016/0268678 A1 | 9/2016 | Agardh et al. | |
| 2016/0269132 A1 * | 9/2016 | Clark .................. | H01Q 3/242 |
| 2019/0044610 A1 * | 2/2019 | Peitzer .............. | H04B 17/12 |

* cited by examiner

*Primary Examiner* — Tuan Pham
(74) *Attorney, Agent, or Firm* — Dorr, Carson & Birney

(57) ABSTRACT

An automated mobile antenna system has a motion sensor to detect whether it is moving or stationary. An omnidirectional antenna is used for communications while the system is moving, and a directional antenna may be used while the system is stationary. The output power of the transceiver can also be adjusted based on the selected antenna.

18 Claims, 6 Drawing Sheets

(DIRECTIONAL MODE)

(OMNI DIRECTIONAL MODE)

ANTENNA SYSTEM WITH AUTOMATED SWITCHING BETWEEN MOBILE AND STATIONARY MODES

BACKGROUND OF THE INVENTION

Field of the Invention

The present invention relates generally to the field of mobile antenna systems. More specifically, the present invention discloses a mobile antenna system that automatically switches to an omnidirectional antenna if the system is in motion, and may use a directional antenna when stationary.

Statement of the Problem

Current intentional radiator systems such as those that are used for wi-fi extenders and signal boosters are authorized for use under strict compliance regulations from governmental organizations around the world such as the Federal Communications Commission (FCC) and Industry Canada. Compliance organizations often regulate the types of antennas that may be used with intentional radiator systems. In addition, these compliance organizations have strict regulations requiring adjustment of the output power of the transmitters of the intentional radiator systems depending on the type of antenna in use.

Many common intentional radiator systems, such as wi-fi extenders and signal boosters, can be used in both mobile and stationary applications. Compliance organizations have differing requirements for authorization of both applications. These regulations do not allow antenna changes or adjustment to the output power unless the system is authorized for professional installation.

Many mobile intentional radiator systems utilize an omnidirectional antenna that receives and transmits in all directions. This allows for optimal operation when the system is in motion and the relative positions of the mobile antenna and antenna tower are constantly changing as the vehicle moves along the road. In contrast, many stationary intentional radiator systems utilize a directional antenna with higher gain solution that receives and transmits in a narrower beam. This allows for optimal operation when stationary where the antenna can be pointed directly at the antenna tower.

In addition to the above considerations, many compliance organizations restrict or prohibit nonprofessional end-users from adjusting the output power of intentional radiators depending on the frequency, type of antenna, and type of wireless transmission system utilized. Marketing regulations on the sale of intentional radiator systems do not allow a nonprofessional end user to adjust the power of the transmitters or use an antenna that is not certified with the transmitter unless it is installed by someone professionally trained to make changes to the system for the required application.

While mobile antenna systems with omnidirectional antennas are authorized to work in stationary mode as well as mobile mode, stationary directional antennas are typically authorized for operation in stationary mode only. Compliance organizations have strict limitations on power output and the output power limits based on the antenna type, frequencies utilized, and application.

Thus, there is a need for an intentional radiator system that can utilize differing types of antennas based on the mobile or stationary mode of the system. Additionally, there is a need for an antenna system that can automatically adjust its output power based on the type of antenna and the frequencies utilized.

Solution to the Problem

The present invention addresses these concerns by providing an automated antenna system having a motion sensor to detect whether the system is in motion or stationary. The antenna system utilizes an omnidirectional antenna while in motion and may utilize a directional antenna while stationary. Optionally, the output power of the transmitter for the antenna system can also be dynamically adjusted based on the selected antenna type and frequency band.

SUMMARY OF THE INVENTION

This invention provides an automated mobile antenna system having a motion sensor to detect whether it is moving or stationary. An omnidirectional antenna is used for communications while the system is mobile, and a directional antenna may be used while the system is stationary. The output power of the transceiver can also be adjusted based on the selected antenna.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
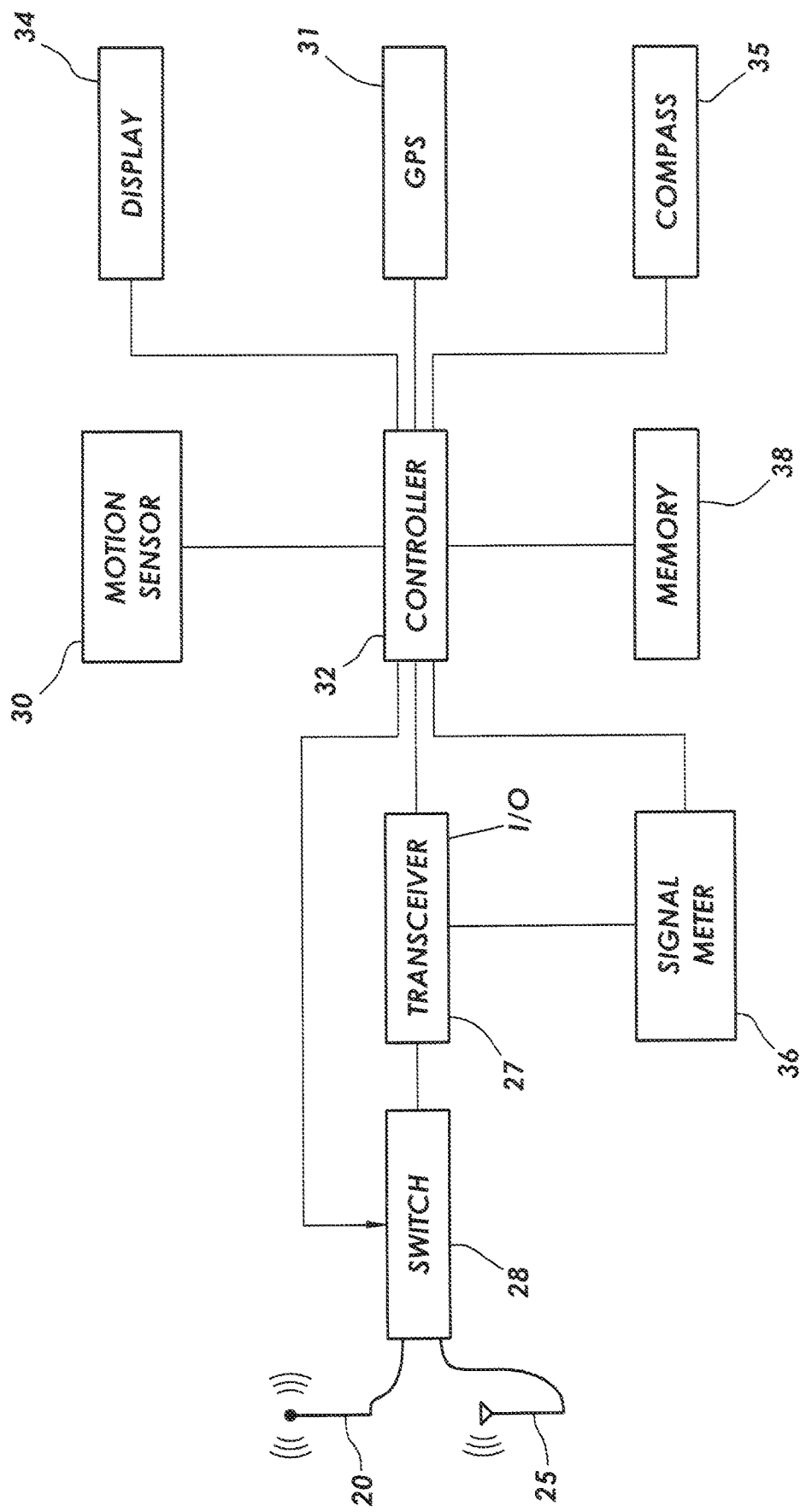
FIG. 1 is a system block diagram of an embodiment of the present invention.
Figure 2:
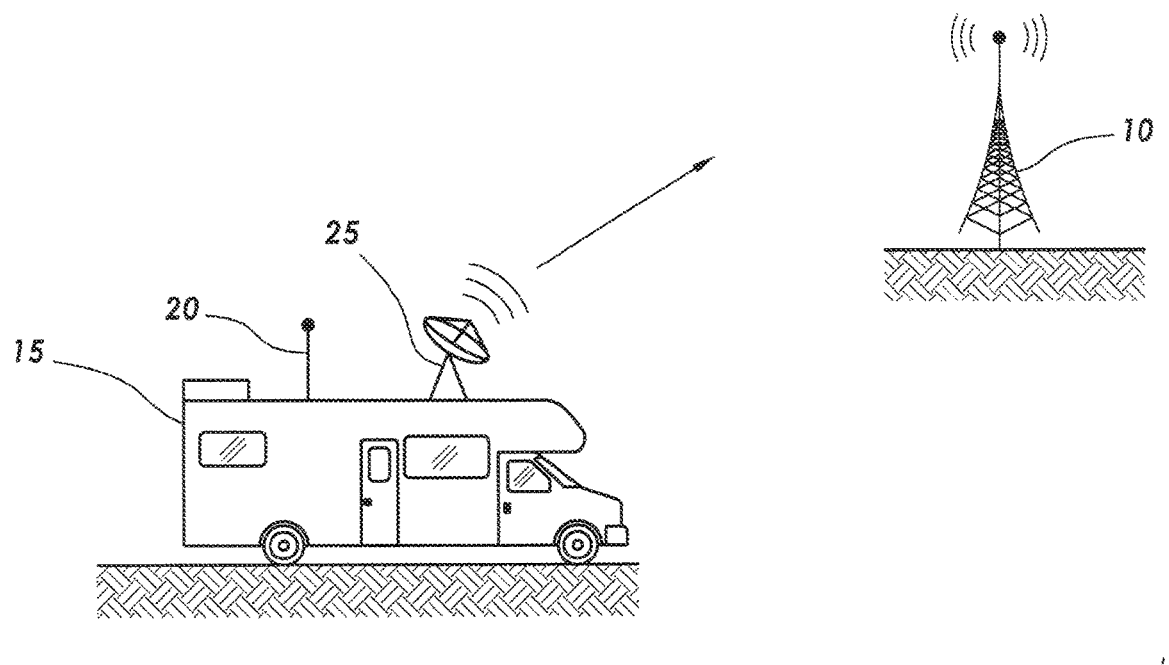
FIG. 2 is a simplified diagram of the present invention operating while stationary with a directional antenna 25.
Figure 3:
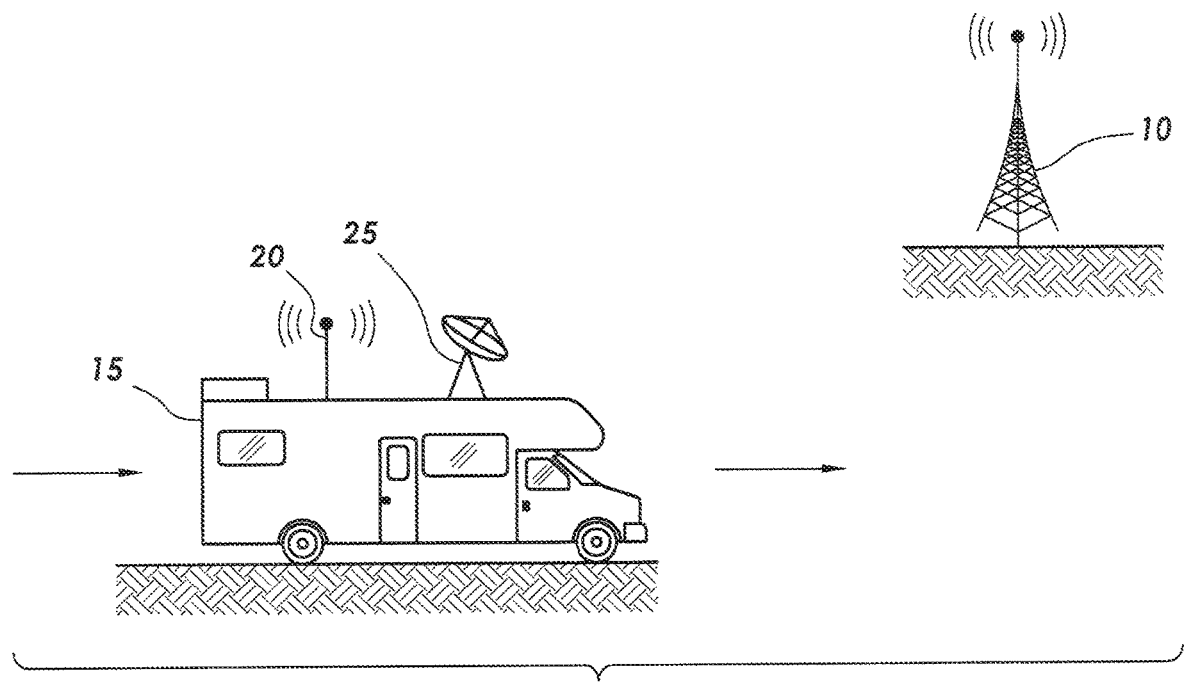
FIG. 3 is a simplified diagram of the present invention operating while in motion with an omnidirectional antenna 20.
Figure 5:
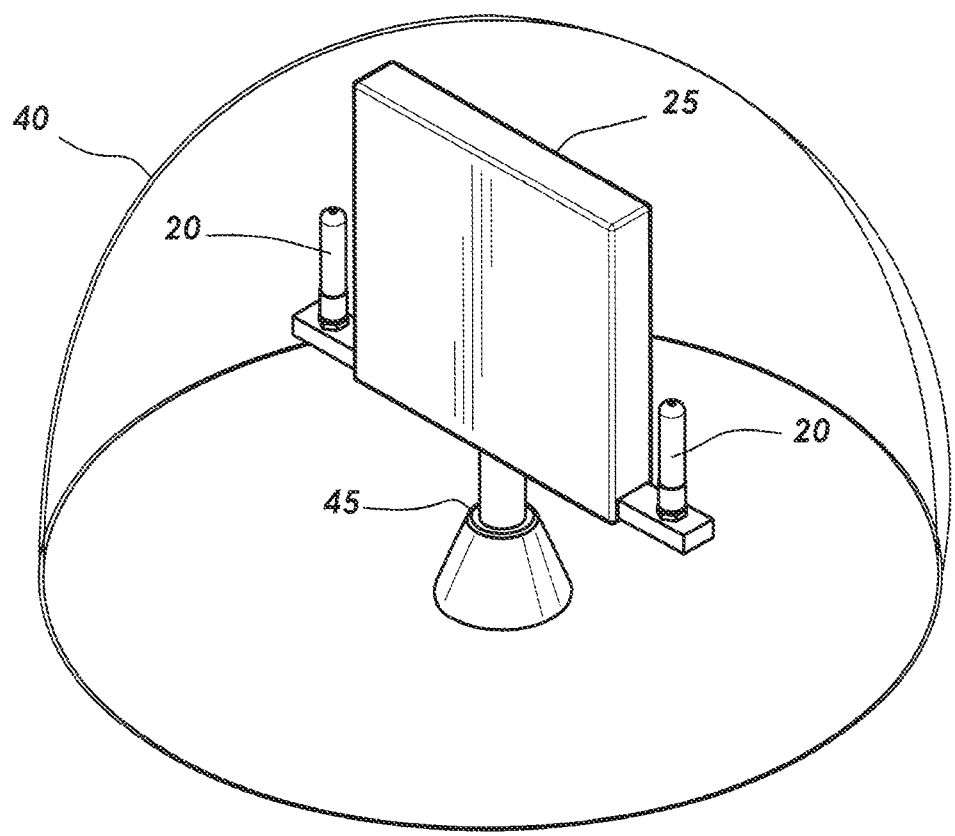
FIG. 5 is a simplified axonometric view of azimuth rotation mechanism 45 and antennas 20, 25 within an enclosure 40.
Figure 6:
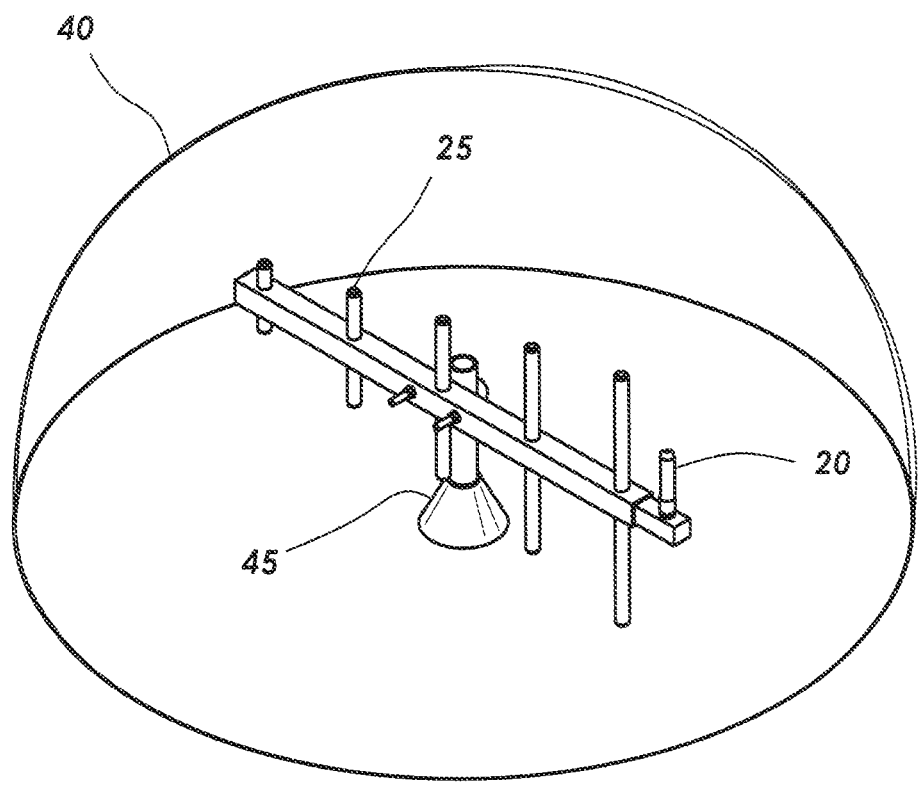
FIG. 6 is a simplified top axonometric view of another embodiment of the present invention in which the azimuth rotation mechanism 45 supports a Yagi antenna 25 and an omnidirectional antenna 20 within the enclosure 40.

Turning to FIG. 1, a system block diagram is provided showing an embodiment of the present invention. The major components include at least one omnidirectional antenna 20 and at least one directional antenna 25. All of the components, including these antennas 20, 25, can be mounted within a housing or enclosure 40 (e.g., a radome as shown in FIGS. 5 and 6) for protection from the elements. These antennas 20, 25 can be portable or secured to a vehicle 15 for mobile applications as shown in FIGS. 2 and 3. The antennas 20, 25 can also be located outside with additional components located inside the vehicle 15.

The antennas 20, 25 are intended to provide two-way communications between a transceiver 27 and remote external signal sources (e.g., remote terrestrial antennas or satellites) 10 as shown in FIGS. 2-3. Please note that the term "transceiver" should be broadly construed to include any combination of wireless transmitter and receiver. In the preferred embodiment of the present invention, the transceiver 27 is capable of two-way wireless communications with a remote signal source 10, such as a terrestrial antenna or a communications satellite. The present invention can be readily adapted for use in any desired frequency band and communications protocol, such as wi-fi, Bluetooth and cellular phone communications.

The omnidirectional antenna 20 has an antenna pattern that is substantially uniform in all directions, at least in the azimuth plane. This can be accomplished by a single antenna having an omnidirectional pattern or by an arrangement of a plurality of directional antennas that approximates an omnidirectional antenna pattern.

In contrast, the directional antenna 25 has a pattern with lobes that are directional in nature (e.g., a Yagi, dipole or dish antenna). A positioning mechanism 45 is typically used to support and point the directional antenna 25 toward a selected signal source 10. Directional antennas typically offer higher gain than omnidirectional antennas when properly pointed toward the signal source 10. Some positioning mechanisms allow adjustments in both the azimuth and elevation of the antenna, while others allow only azimuth adjustment.

Figure 4:
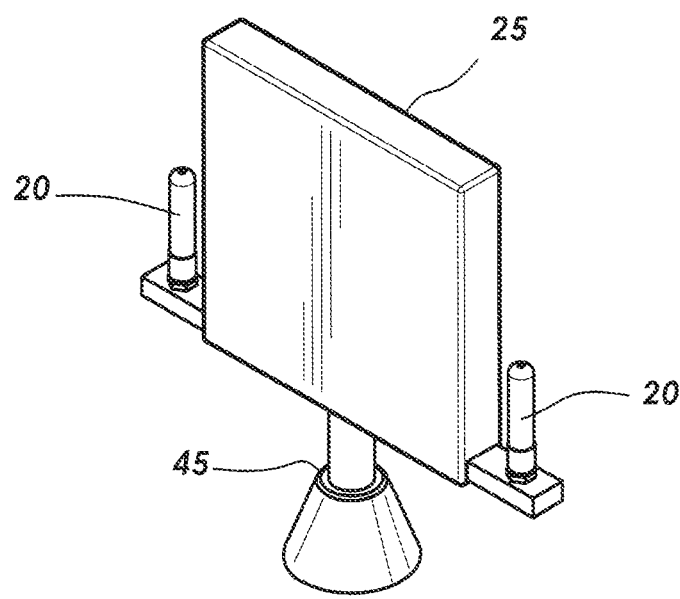
FIG. 4 is a simplified axonometric view of the azimuth rotation mechanism 45 supporting two omnidirectional antennas 20 and a directional antenna 25.

FIGS. 4-6 show an azimuth rotation mechanism 45 supporting both the omnidirectional and directional antennas 20, 25. FIG. 6 illustrates an embodiment of the present invention in which the azimuth rotation mechanism 45 supports a Yagi antenna 25 and an omnidirectional antenna 20 within the enclosure 40. The azimuth positioning mechanism 45 can be driven by an electric motor controlled by a controller 32 to automatically point the directional antenna 25 toward a selected signal source 10. For example, the electric motor can rotate the directional antenna 25 within the enclosure 40 in the azimuth plane. Alternatively, the position of the directional antenna 25 could be manually adjusted by a crank mechanism or the like. This process can also be automated or assisted with a smart phone app or similar software.

Returning to FIG. 1, a motion sensor 30 detects whether the vehicle 15 is in motion or stationary. For example, an accelerometer could be used. A location sensor could be readily substituted. Motion can be detected as a change in position with respect to time. Alternatively, the motion sensor 30 could tie into the vehicle's electrical system or speedometer to detect operation of the vehicle 15 or its speed and thereby determine the appropriate mode of operation for the present system.

A controller 32 (e.g., a computer processor) monitors the motion sensor 30 and controls overall operation of the present system. Additionally, the controller 32 can be equipped with a display 34 providing a user interface, and memory 38. A signal strength meter 36 can also be included to measure and display the received signal strength from the selected antenna 20 or 25.

In operation, the controller 32 monitors the motion sensor 30 to determine whether the vehicle 15 is in motion or stationary. If the vehicle 15 was previously stationary and begins to move, the controller 32 automatically switches 28 the transceiver 27 so that it uses an omnidirectional antenna 20, as shown in FIG. 3. The controller 32 should filter out random vibration and transitory movements (e.g., caused by wind gusts) that might be erroneously interpreted as a change to mobile mode. Optionally, if the vehicle 15 was previously moving and becomes stationary, the system can also include means for switching 28 the transceiver 27 to use one or more of the directional antennas 25, as shown in FIG. 2. For example, this can be implemented as an option for the user to select the directional mode if the motion sensor 30 detects that the vehicle 15 has stopped moving.

If switching from omnidirectional to directional mode, the position of the directional antenna 25 can be adjusted to optimize communications with the desired external signal source 10 (see FIG. 3). This can be done by manual adjustment or the controller 32 can automatically direct the directional antenna 25 to perform a scan over its range of movement to identify external signal sources 10. The controller can then store information in memory 38 relating to the location, identity, channel information, signal strength etc. of the signal sources 10 found during the scan for later use in an operational mode. The controller 32 can also access internet databases (e.g., an FCC database) to identify available signal sources based on the current location and orientation of the unit as indicated by the GPS 31 and compass 35. This information can be used to optimize and simplify the initial scanning process, or to point the directional antenna 25 toward desired signal sources 10 in the operational mode. The controller 32 can also employ the display 25 to provide a graphical user interface (GUI) for user interaction in controlling operation of the system and selection of the desired programming. These function can be implemented in a smart phone app or similar software. For example, the display 25 can be programmed to show a list of the available signal sources 10 and their corresponding identities, channels and signal strength information.

Figure 7:
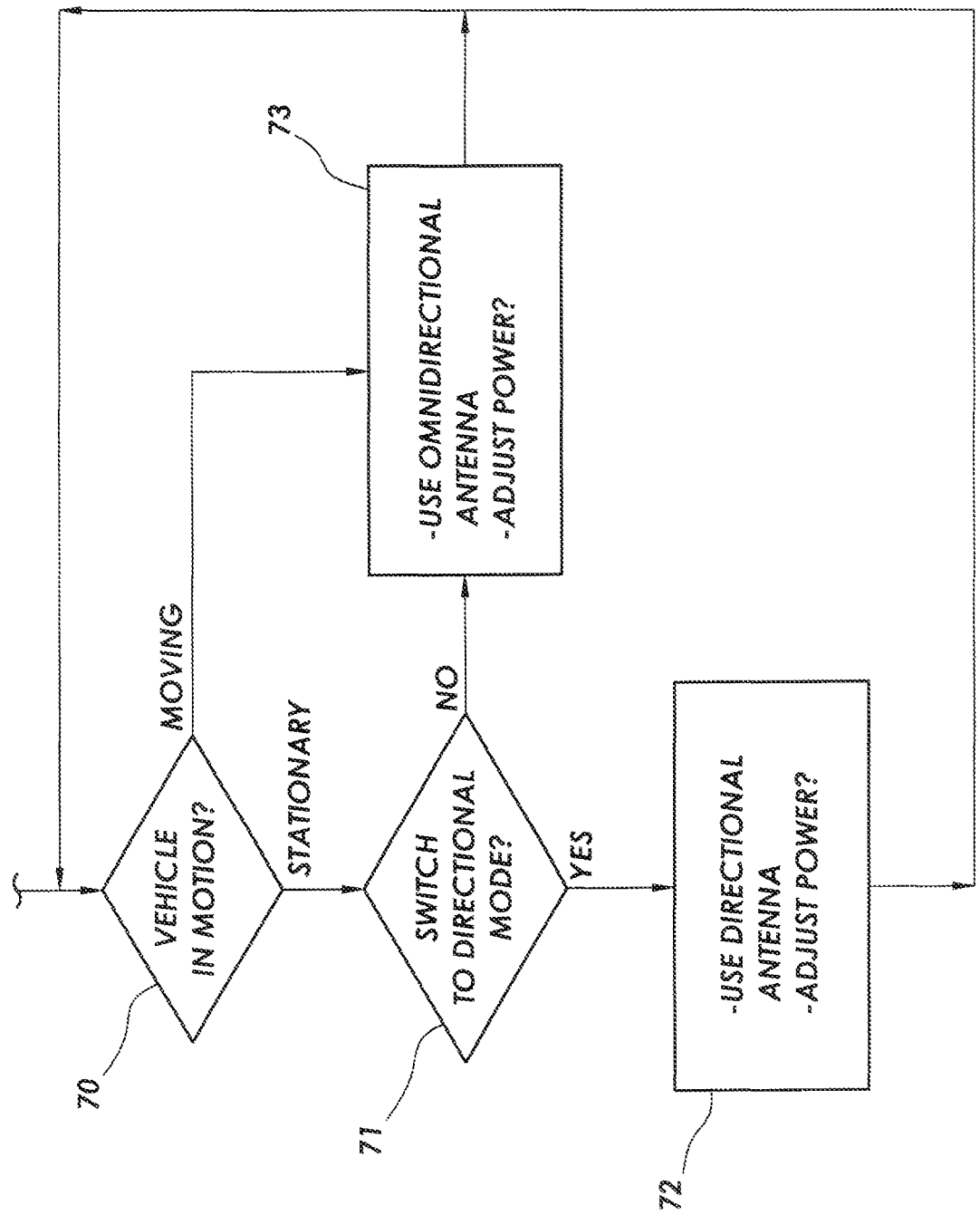
FIG. 7 is a flowchart of operation of the preferred embodiment of the present invention.

FIG. 7 is a flowchart illustrating the preferred embodiment of the present invention. The controller 32 monitors the motion sensor 30 to detect if the vehicle 15 has begun to move (block 70). If so, the system automatically switches from the directional antenna 25 to an omnidirectional antenna 20 and may make a corresponding power adjustment (block 73), as previously discussed. On the other hand, if the motion sensor 30 detects that the vehicle 15 has become stationary, the controller 32 may present the user with the option of either switching to a directional antenna 25 or continuing to use an omnidirectional antenna 20 (block 71). Continued use of the omnidirectional antenna 20 may be satisfactory after the vehicle 15 becomes stationary depending on signal strength. For example, the omnidirectional antenna 20 may be adequate in an urban setting or when signal sources 10 are near. If so, the user may wish to continue using the omnidirectional antenna 20 after the vehicle 15 becomes stationary (block 73). Otherwise, the user may elect to switch to a directional antenna 25 (block 72), as previously discussed.

In the preferred embodiment of the present invention, the controller 32 can adjust the output signal power of the transceiver 27 based on the characteristics of the selected antenna (in blocks 72 and 73). A directional antenna 25 typically offers higher overall gain solution than an omnidirectional antenna 20. The maximum output signal power can be dynamically adjusted, either up or down, based on the type or gain of the selected antenna, the frequency band, or the received signal strength from external signal sources 10.

The present invention can be applied as a signal booster or ranger extender in a variety of fields of use, each of which may be subject to different governmental regulations for the mobile and stationary modes of operation. For example, if the present system is used as a signal booster for cellular phone service, FCC regulations may allow the transmit power to be increased when using the directional antenna 25 in the stationary mode. In contrast, a lower maximum cellular transmit power may be permissible for an omnidirectional antenna 20. In this scenario, the present system can automatically boost the amplifier gain of the transceiver 27 accordingly when using the directional antenna 25 in stationary mode and reduce the amplifier gain in mobile mode.

On the other hand, FCC regulations governing a wi-fi extender require that the wi-fi transmit power must be somewhat lower when using a directional antenna, but this can be more than offset by the higher gain of an directional antenna. This results in an overall increase in signal strength in comparison to an omnidirectional antenna.

Figure 9:
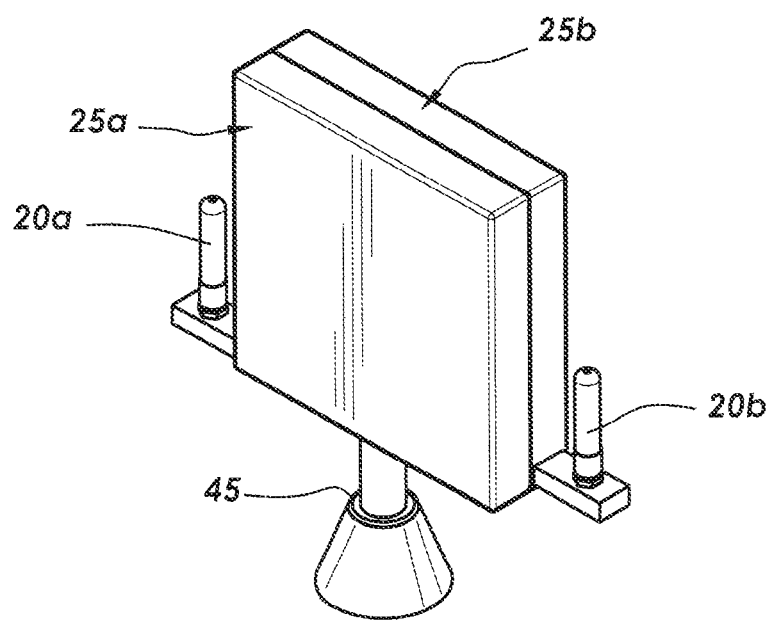
FIG. 9 is a simplified axonometric view of an azimuth rotation mechanism 45 supporting two omnidirectional antennas 20a, 20b and two directional antennas 25a, 25b mounted in a back-to-back configuration for supporting cellular and wi-fi communications.
Figure 8:
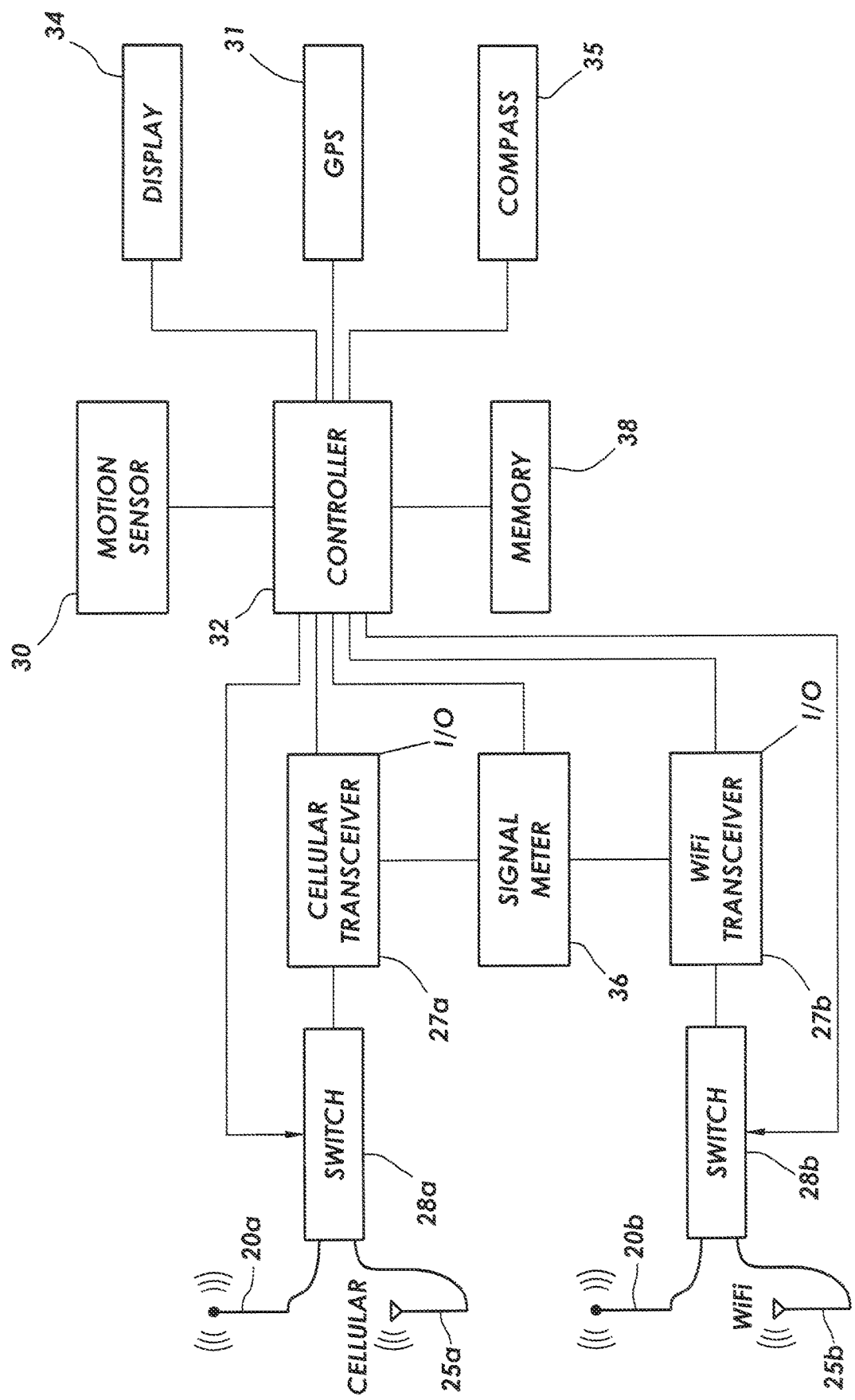
FIG. 8 is a system block diagram of an alternative embodiment of the present invention having two omnidirectional antennas 20a, 20b and two directional antennas 25a, 25b for supporting cellular and wi-fi communications.

It should also be noted that the present invention could employ a plurality of omnidirectional antennas 20a, 20b and a plural of directional antennas 25a, 25b, as shown in FIGS. 8 and 9. For example, multiple antennas may be optimized to use in various frequency bands, such as wi-fi or cellular communications. FIG. 8 is a simplified block diagram of an alternative embodiment similar to FIG. 1 that employs a first omnidirectional antenna 20a and a first directional antenna 25a for cellular communications, and a second omnidirectional antenna 20b and a second directional antenna 25b for wi-fi communications. Both sets of antennas 20a, 25a and 20b, 25b have their own transceiver 27a or 27b selected by the controller 32 for the desired frequency band. Similar to the embodiment in FIG. 1, the controller 32 selects whether to use one of the omnidirectional antennas 20a, 20b or one of the directional antennas 25a, 25b by means of switches 28a, 28b.

Even for use in a single frequency band, multiple omnidirectional antennas 20a, 20b can be employed simultaneously. If a plurality of directional antennas 25a, 25b are provided, they could be supported and positioned by a common azimuth rotation mechanism 45, as depicted in FIG. 9. For example, two directional antennas 25a and 25b can be mounted in a back-to-back configuration on the same azimuth rotation mechanism 45. The controller 32 can then rotate the azimuth rotation mechanism 45 to point the selected directional antenna 25a or 25b toward the external signal source 10.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. An antenna system comprising:
   at least one omnidirectional antenna;
   at least one directional antenna;
   a motion sensor detecting whether the antenna system is moving or stationary;
   a transceiver for wireless communications using either an omnidirectional antenna or a directional antenna; and
   a controller selecting either at least one omnidirectional antenna or at least one directional antenna for communications by the transceiver, said controller selecting at least one omnidirectional antenna when the motion sensor detects the antenna system is moving, and enabling a user to select at least one directional antenna for communications by the transceiver while the motion sensor detects the antenna system is stationary.

2. The antenna system of claim 1 wherein the controller adjusts the output power of the transceiver based on the selected antenna.

3. The antenna system of claim 2 wherein the controller adjusts the output power of the transceiver based on the gain of the directional antenna.

4. The antenna system of claim 2 wherein the controller adjusts the output power of the transceiver based on the frequency band for communications by the directional antenna.

5. The antenna system of claim 1 further comprising a positioning mechanism for adjusting the position of the directional antenna, and wherein the controller directs the positioning mechanism to point the directional antenna toward a selected external signal source when the antenna system is stationary.

6. The antenna system of claim 5 wherein the controller searches for and stores information on external signal sources by conducting an initial sweep by the directional antenna when the antenna system becomes stationary.

7. The antenna system of claim 1 further comprising a location sensor for determining the location of the antenna system, and wherein the controller accesses and retrieves data from an external database of signal sources and identifying information based on the location of the antenna system when the antenna system becomes stationary.

8. The antenna system of claim 1 further comprising an enclosure housing the antenna system mounted to a vehicle.

9. The antenna system of claim 1 wherein the motion sensor comprises an accelerometer.

10. An antenna system comprising:
    at least one omnidirectional antenna;
    at least one directional antenna;
    a motion sensor detecting whether the antenna system is moving or stationary;
    a transceiver for wireless communications using either an omnidirectional antenna or a directional antenna; and
    a controller selecting either at least one omnidirectional antenna or at least one directional antenna for communications by the transceiver and adjusting the output power of the transceiver based on the selected antenna, said controller selecting at least one omnidirectional antenna when the motion sensor detects the antenna system is moving, and enabling a user to select at least one directional antenna for communications by the transceiver while the motion sensor detects the antenna system is stationary.

11. The antenna system of claim 10 further comprising a positioning mechanism for adjusting the position of the directional antenna, and wherein the controller directs the positioning mechanism to point the directional antenna toward a selected external signal source when the antenna system is stationary.

12. The antenna system of claim 10 wherein the controller searches for and stores information on external signal sources by conducting an initial sweep by the directional antenna when the antenna system becomes stationary.

13. The antenna system of claim 10 further comprising a location sensor for determining the location of the antenna system, and wherein the controller accesses and retrieves data from an external database of signal sources and identifying information based on the location of the antenna system when the antenna system becomes stationary.

14. The antenna system of claim 10 further comprising an enclosure housing the antenna system mounted to a vehicle.

15. An antenna system comprising:
   a housing having an interior enclosure;
   at least one omnidirectional antenna within the enclosure;
   at least one directional antenna within the enclosure;
   a positioning mechanism selectively rotating the at least one directional antenna within the enclosure;
   a motion sensor detecting whether the antenna system is moving or stationary;
   a transceiver for wireless communications using either at least one omnidirectional antenna or a directional antenna; and
   a controller selecting a omnidirectional antenna for communications by the transceiver when the motion sensor detects the antenna system is moving, and selecting a directional antenna for communications by the transceiver and controlling the positioning mechanism to point the selected directional antenna toward a selected external signal source when the motion sensor detects the antenna system is stationary.

16. The antenna system of claim 15 wherein the transceiver allows adjustment of the output power for transmissions, and wherein the controller adjusts the output power of the transceiver based on the selected antenna.

17. The antenna system of claim 15 wherein the controller searches for and stores information on external signal sources by conducting an initial sweep by the directional antenna when the antenna system becomes stationary.

18. The antenna system of claim 15 wherein operation of the controller is controlled via a smart phone app.

* * * * *